United States Patent [19]

Bush et al.

[11] Patent Number: 4,525,528

[45] Date of Patent: Jun. 25, 1985

[54] PEROXIDE-CURABLE FLUOROSILICONE COPOLYMER COMPOSITIONS

[75] Inventors: Richard B. Bush, Schenectady; Edwin R. Evans, Saratoga, both of N.Y.

[73] Assignee: General Electric Company, Waterford, N.Y.

[21] Appl. No.: 540,491

[22] Filed: Oct. 11, 1983

[51] Int. Cl.³ .............................................. C08L 83/04
[52] U.S. Cl. ..................... 524/860; 528/24; 528/32; 528/37; 528/42; 556/463; 556/468
[58] Field of Search ............. 528/42, 24, 32, 37; 556/488, 463; 524/860

[56] References Cited

U.S. PATENT DOCUMENTS

| | | | |
|---|---|---|---|
| 3,978,104 | 8/1976 | Razzano | 528/37 |
| 3,997,496 | 12/1976 | Razzano | 528/42 |
| 4,028,338 | 6/1977 | Razzano | 528/42 |
| 4,029,629 | 6/1977 | Jeram | 528/42 |
| 4,075,169 | 2/1978 | Razzano | 528/42 |
| 4,122,247 | 10/1978 | Evans | 528/14 |
| 4,157,337 | 6/1979 | Evans | 260/448.2 |
| 4,177,200 | 12/1979 | Razzano et al. | 260/448.2 |
| 4,317,899 | 3/1982 | Bluestein et al. | 528/37 |
| 4,417,024 | 11/1983 | Koda et al. | 528/42 |

Primary Examiner—Melvyn I. Marquis

[57] ABSTRACT

Peroxide-curable fluorosilicone copolymers are provided which, when compounded and cured, form elastomers of superior physical properties, especially in terms of solvent swell and thermal aging. Curable compositions prepared according to the present invention make possible the efficient production of high quality electrical connectors for aerospace and other applications.

19 Claims, No Drawings

PEROXIDE-CURABLE FLUOROSILICONE COPOLYMER COMPOSITIONS

FIELD OF THE INVENTION

The present invention relates to fluorosilicone elastomers. More particularly, it relates to curable fluorosilicone copolymer compositions which provide superior physical properties and are suitable for the manufacture of high quality electrical connectors.

BACKGROUND OF THE INVENTION

Platinum catalyzed fluorosilicone/organosilicone blends and low molecular weight silicone copolymer compositions such as those described in U.S. Pat. No. 4,122,247 (Evans), U.S. Pat. No. 4,157,337 (Evans), and U.S. Pat. No. 4,317,899 (Bluestein et al) have found use as low energy molding compounds in the aerospace industry for making high quality electrical connectors and other molded silicone rubber inserts. Such compounds, which cure via hydrosilation addition reaction in the presence of platinum, display the advantages of rapid processing, fast deep section curing, low rejection rate, and good mechanical properties. However, in spite of these advantages, the addition cure systems are susceptible to catalyst poisoning, e.g., from small amounts of compounds such as carbon monoxide or sulfur or amines, which tie up platinum; the ratio of silicon hydride to olefin functionality for optimal properties must fall within a narrow range; a critical range of inhibitor to catalyst is necessary to provide rapid cure along with adequate working shelf life; and the systems are also susceptible to organic contaminants which can adversely affect the thermal stability of the cured parts.

In order to secure better thermal aging properties, many electrical connector manufacturers have tested peroxide-cured fluorosilicone systems made by blending heat-curable fluorosilicone compounds with polydimethylsiloxane gums. Because of the nature of the curing reaction, addition cure compositions do not fully cure initially, and further curing in response to high temperatures encountered by the compositions in use may lead to shrinkage of the molded component, making it unsuitable for continued used. Greater dimensional stability is provided by peroxide-curable systems which fully cure and so do not shrink in use. It has been observed that the peroxide-curable blends, however, require a higher overall average fluorine content to provide sufficient solvent resistance. Consequently, there has been a need for a peroxide-curable fluorosilicone copolymer gum which exhibits the desirable processability of the addition cure systems while providing better thermal aging and good resistance to solvent swell.

SUMMARY OF THE INVENTION

Accordingly, it is an object of the present invention to provide a fluorosilicone copolymer gum that is curable in the presence of peroxide catalysts.

It is a further object of the present invention to provide a peroxide-curable fluorosilicone copolymer composition useful for the manufacture of high quality electrical connectors.

It is a further object of the present invention to provide a curable fluorosilicone composition which, when compounded and cured, exhibits superior physical properties, including low solvent swell and good thermal aging.

These and other objects are accomplished herein by a peroxide-curable silanol- or alkenyl-endstopped diorganopolysiloxane copolymer oil or gum comprising units of the formulae $RR'SiO$ and $R''_2SiO$, wherein R is fluoroalkyl of from 3 to 8 carbon atoms, R' is alkyl of from 1 to 8 carbon atoms or phenyl, and each R" is, independently, alkyl of from 1 to 8 carbon atoms, alkenyl of from 2 to 8 carbon atoms, or phenyl, and wherein sufficient $RR'SiO$ units are present to provide at least about 45 mole percent fluorosilicone content and sufficient $R''_2SiO$ units containing alkenyl substituents are present to provide up to about 0.5 weight percent vinyl content (as $CH_2=CH-$) along the polysiloxane chain.

Also contemplated is a curable fluorosilicone composition comprising (A) a silanol-endstopped or alkenyl-endstopped diorganpolysiloxane copolymer oil or gum comprising units of the formulae $RR'SiO$ and $R''_2SiO$, wherein R is fluoroalkyl of from 3 to 8 carbon atoms, R' is alkyl of from 1 to 8 carbon atoms or phenyl, and each R" is, independently, alkyl of from 1 to 8 carbon atoms, alkenyl of from 2 to 8 carbon atoms, or phenyl, and wherein sufficient $RR'SiO$ units are present to provide at least about 45 mole percent fluorosilicone content and sufficient $R''_2SiO$ units containing alkenyl substituents are present to provide up to about 0.5 weight percent vinyl content (as $CH_2=CH-$) along the polysiloxane chain; and (B) a peroxide catalyst.

Processes for preparing the copolymers and compositions of the present invention are also contemplated.

All of the U.S. patents mentioned above or hereinafter are hereby incorporated by reference.

DETAILED DESCRIPTION OF THE INVENTION

The fluorosilicone copolymers of the present invention may be compounded and cured in conventional ways in the presence of a peroxide catalyst to provide dimensionally stable cured parts having exceptional resistance to solvent swell, superior thermal aging properties and mechanical properties which exceed strict industrial aerospace specifications.

The R, R' and R" substituents defined above are representative of monovalent hydrocarbon radicals and halogenated monovalent hydrocarbon radicals that are well known as attachments to silicon atoms. Preferably, the fluoroalkyl substituent, R, contains 3 or more carbon atoms and 1 or more fluorine atoms, the radicals including, for example, 3-fluoropropyl, 3,3-difluoropropyl, 3,3,3-trifluoropropyl, and the like up to 8 carbon atoms. More preferably, the R radical is a substituted alkyl group such as, $-CH_2CH_2R^3$, wherein $R^3$ is perfluoroalkyl containing from 1 to 6 carbon atoms, such as perfluoromethyl, perfluoroethyl, perfluorohexyl, and the like. Most preferably, the R radical is 3,3,3-trifloropropyl. R' is preferably methyl; R" is preferably methyl or vinyl, with at least 1 vinyl group being present along the copolymer chain but no more vinyl groups being present than would provide about 0.5 weight percent vinyl, as vinyl, the rest of the R" groups being methyl.

The copolymers of the present invention may be synthesized from diorganodihalogensilanes of the formulae $RR'SiX_2$ and $R''_2SiX_2$, wherein R, R' and R" are as previously defined, and X is halogen, such a chlorine or bromine (preferably chlorine), as described in the aforementioned Evans patents, U.S. Pat. No. 4,122,247 and U.S. Pat. No. 4,157,337, which are incorporated herein by reference. The diorganodihalogensilanes, at a purity of at least 99% by weight, are added to water at room temperature, e.g., 20°–25° C. to provide from about 2 to 10 moles of water per mole of diorganodihalogensilane. After the diorganodihalogensilanes have been added to the water it will contain about 20% by weight of HCl.

Optionally, hydrolysis may be carried out in the presence of a water-immiscible solvent such as, for example, toluene, xylene, benzene, and the like. The use of a solvent facilitates the separation of the hydrolyzate from the aqueous acid solution. Preferably, a water-immiscible organic solvent is added to the water prior to the addition of the diorganodihalogensilanes. The diorganodihalogensilanes, preferably at greater than 99% purity, are added to the water (or water/water-immiscible solvent mixture) over a one-half to two hour period, with agitation. Where a solvent is used, the hydrolyzate is seen to dissolve in the solvent phase, and this is then separated from the water phase. The hydrolyzate is finally neutralized with a mild base, such as sodium bicarbonate, to a pH of about 7 to 8. Alternatively, the hydrolyzate may be washed repeatedly with water until a neutral pH is reached.

The hydrolyzate product is a mixture containing mostly cyclic polysiloxanes of from 3 to 10 silicon atoms and low molecular weight linear silanol-endstopped diorganopolysiloxanes. This raw hydrolyzate is useful as a treating agent for fumed silica fillers, as described in U.S. application Ser. No. 410,004, filed Aug. 20, 1982, incorporated herein by reference.

Heating the hydrolyzate at elevated temperatures removes any solvent by overhead distillation. The hydrolyzate is then cracked by a procedure comprising adding from 0.1 to 5% by weight (preferably 0.1 to 2% by weight) of a cracking catalyst, such as potassium hydroxide or cesium hydroxide, then heating.

The cracking procedure is typically carried out at temperatures between 150° and 200° C., and preferably heating is carried out under a vacuum of 1 to 100 millimeters of mercury for a period of from about 1 to 5 hours. A mixture of cyclic polysiloxanes, specifically cyclic trimers, tetramers and pentamers will be continually distilled overhead. The cracking procedure is utilized to maximize the formation of the cyclic trimer from the broad range in the hydrolyzate. This permits conversion of about 95% by weight of the hydrolyzate to cyclic trisiloxanes, cyclic tetrasiloxanes, and cyclic pentasiloxanes, predominantly cyclic trisiloxanes. The cyclic polysiloxanes may be separated by known distillation procedures from the other cyclics.

It is preferred that there be less than 10 parts per million of water in the composition of cyclic siloxanes to be utilized with the catalyst to make polymers. Removal of all but traces of water may be accomplished by heating to 100° C. or above, with a nitrogen purge. This effectively reduces the water content of the cyclic siloxane composition to less than 10 parts per million. It has been found that if there is substantially more than this amount of water present, the desired copolymer gum will not be formed in commercially attractive yields.

To prepare the copolymers of the invention, cyclic polysiloxanes of the formulae $(RR'SiO)_x$ and $(R''_2SiO)_y$, where R, R' and R'' are as previously defined and x and y are integers from 3 to 6, are placed in a reaction vessel. An alkali metal hydroxide polymerization catalyst (preferably KOH) in amounts to provide about 5 to 500 parts per million of the catalyst are added to the cyclics mixture. Polymerization is then carried out by heating at a temperature of from 20° to 160° C. for a period of from ½ hour to 20 hours, during which time equilibrium is reached. At this point, 70 to 88% by weight or more of the cyclic siloxanes will have been converted to the desired diorganopolysiloxane copolymer oil or gum. The reaction mixture can be cooled, e.g., to under 25° C., and the catalyst neutralized.

A number of conventional neutralizing agents may be used, however neutralizing agents preferred for the purposes herein include phosphoric acid, tris(2-chloroethyl)phosphite, and silyl phosphate (See, e.g., U.S. Pat. No. 4,177,200 (Razzano et al.), incorporated herein by reference), and also organohalosilanes or halosilanes of the formulae $R^4{}_bSiX_{4-b}$, wherein $R^4$ is alkyl, cycloalkyl, vinyl or phenyl, the alkyl and cycloalkyl groups having from 1 to 8 carbon atoms; b is an integer from 1 to 3; and wherein X is bromine or chlorine. These silane compounds include, e.g., trimethylchlorosilane.

After neutralization, the reaction mixture is heated at elevated temperatures, e.g., 150° to 200° C. under a vacuum of 1 to 100 millimeters of mercury to strip the unreacted cyclic polysiloxanes to yield the diorganopolysiloxane copolymer oil or gum.

In accordance with known procedures, the viscosity of the copolymer may be controlled by adding a chain-stopper to the composition of co-monomers and polymerization catalyst. Such chainstoppers can be, for example, disiloxanes or low molecular weight diorganopolysiloxanes having, preferably, either silanol (SiOH) or vinyl terminal units. The organo substituents in such chainstoppers are typically alkyl of from 1 to 8 carbon atoms, vinyl, phenyl, cycloalkyl of from 4 to 8 carbon atoms, or haloalkyl, especially fluoroalkyl, such as trifluoropropyl. Preferred chainstoppers for the purposes herein include, HO—$(R^5R^6SiO)_3$—H, where $R_5$ is alkyl and $R^6$ is 3,3,3-trifluoropropyl, and Vi(Me)$_2$—(-MeR$^6$SiO)$_x$(Me$_2$SiO)$_y$Si—(Me)$_2$Vi,$_6$ wherein x=23, y=38, Vi is vinyl, Me is methyl, and R is 3,3,3-trifluoropropyl.

Generally, the amount of chainstopper introduced to the equilibration mixture will be selected to produce the desired final molecular weight or viscosity of the diorganopolysiloxane copolymer oil or gum. Higher amounts of chainstopper will produce lower molecular weights, and smaller amounts will produce higher moleculer weights. For the purposes of the present invention, it is generally preferred to use sufficient chainstopper to provide a copolymer having a Willams Plasticity (3 minute reading) of about 160 to 220, or to provide a copolymer having a molecular weight of from about 400,000 to 600,000.

As mentioned previously the fluorosilicone copolymers should have a fluorosilicone content of at least 45 mole percent in order to exhibit a desired high resistance to solvent swell. Preferably the fluorosilicone content of the copolymer will fall in the range of 45–65 mole percent, more preferably 50–60 mole percent, and most preferably 52–57 mole percent. Obviously, where solvent swell is not a concern of the practitioner, the fluorosilicone content of the copolymer may be varied within wider limits.

In addition, sufficient alkenyl-functional starting materials should be added to the polymerization mixture to provide up to about 0.5 weight percent vinyl content (as $CH_2$=$CH$—), preferably 0.02–0.2 weight percent, and most preferably 0.03–0.1 weight percent vinyl along the copolymer chain. This on-chain alkenyl functionality allows for a "tighter" cure and thereby contributes to the higher dimensional stability of the cured compositions according to this invention. However, higher levels of on-chain unsaturation than about 0.5 weight percent (as $CH_2=CH-$) leads to too tight a cure, adversely affecting other mechanical properties of the cured compositions, e.g., compression set.

The aforementioned copolymers are curable in the presence of peroxide catalysts which initiate a crosslinking hydrogen abstraction reaction between the pendant alkenyl groups and pendant saturated hydrocarbon groups (or possibly a halogen abstraction reaction, in the case of pendant fluorocarbon groups) of the copolymer chains. This type of free-radical initiated abstraction is promoted by small amounts, such as about 0.01% by weight of the more active organic peroxide initators. Greater amounts, such as up to about 5.0% by weight or more of the initiator may be used, but amounts in excess of about 1.5% by weight may promote coupling reactions which undesirably increase the viscosity of the reaction mixture.

The most suitable peroxide initiators are compounds of the formula, AOOH or AOOA, in which A is an organic radical, especially those compounds in which at least one peroxide oxygen is attached to a tertiary carbon atom. Preferred such initiators include t-butyl hydroperoxide, cumene hydroperoxide, decaline hydroperoxide, di-t-butyl peroxide, dicumyl peroxide, 2,5-dimethyl-2,5-di-(t-butyl peroxy)hexane; also cyclic peroxides such as ascaridole and 1,5-dimethylhexane-1,5-peroxide, peresters such as t-butyl-perbenzoate, t-butyl-peroxyisopropylcarbonate and t-butyl peroctoate, and ketone peroxides such as acetone peroxide and cyclohexanone peroxide. The peroxides containing tertiary alkoxy radicals have been found to be more efficient in abstracting hydrogen (or halogen) atoms from the pendant organic groups linked to the silicon atoms, and they are therefore preferred. 2,5-dimethyl-2,5-di-(t-butyl peroxy)hexane is most preferred and is available commercially, e.g., at 45% by weight on an inert filler under the tradenames, VAROX ® (R. T. Vanderbilt Co., Inc.) and LUPERCO ® 101XL (Lucidol Division, Pennwalt Corp.).

The fluorosilicone copolymer oils or gums of the present invention, when combined with the aforementioned peroxide curing catalysts form curable compositions having superior physical properties, compared to prior addition cure silicone compositions. Obviously, the copolymers can be formulated, e.g., by mixing with reinforcing fillers, such as fumed silica or precipitated silica; extending fillers, such as zinc oxide, titanium oxide, diatomaceous earth, and the like; heat aging additives, such as iron oxide; pigments or dyes; flame retardants, such as platinum (as platinum or in combination with other materials such as triallylisocyanurate); adhesion promotors, such as organic silazanes, which promote bonding between fillers and the gum; and other additives, including anti-oxidants, processing aids (e.g., silanol fluids), compression set resistance promotors (e.g., cerium hydroxide), supplementary curing agents (e.g., materials that provide additional vinyl curing sites) such as trimethylol propane trimethacrylate (Sartomer ® 350; Sartomer Co.), triallyl trimellitate (Sipomer ® TATM; Alcolac, Inc.), 1,3,5-trimethyl-1,3,5-trivinylcyclotrisiloxane, 1,3,5,7-tetramethyl-1,3,5,7-tetravinylcyclotetrasiloxane, and the like.

A particularly useful filler for the compositions described herein is a silica filler, preferably fumed silica, that has been treated with the raw hydrolyzate containing mixed cyclic polysiloxanes and low molecular weight linear polysiloxanes described above. Such fillers are disclosed in copending U.S. application Ser. No. 410,004, filed Aug. 20, 1982 and incorporated herein by reference.

The copolymer gums, mixed into a uniform mass to which is added a peroxide curing agent, may be cured at elevated temperatures, for example from about 100° to 300° C., or by exposure to radiation, to produce fluorosilicone elastomers having the aforementioned superior physical properties, including exceptional resistance to solvent swell and excellent thermal aging characteristics.

In order that persons skilled in this art may more readily practice the present invention, the following examples are provided by way of illustration, and not by way of limitation. All measurements are by weight.

EXAMPLES 1-3

Sample 1

1716 parts by weight of methyl-3,3,3-trifluoropropylsiloxane cyclic trimer, 821 parts by weight dimethyl siloxane cyclic tetramer, and about 850 parts per million (ppm) $HO-(MeCH_2CH_2CF_3SiO)_3-H$ chainstopper were added to a clean, dry polymerization vessel equipped with stirrer, nitrogen inlet, and thermometer. The mixture was heated to 140°-160° C. and with a nitrogen sparge, 115 parts by weight dimethylsiloxane cyclic tetramer were removed to azeotropically dry (to fewer than 10 ppm of moisture) the reaction mixture. While maintaining a positive atmosphere of nitrogen, the vessel was allowed to cool to 135°-142° C., at which point 3.1 parts by weight methyl vinyl siloxane cyclic trimer (99% purity) and sufficient potassium hydroxide* to provide 25 ppm (as potassium hydroxide) were added. The resulting exotherm caused a 16° C. temperature rise within about 30-35 seconds, which subsided over a 60-minute period to the 135°-145° C. range.
*KOH is colloided in 1,3,5,7-octamethylcyclotetrasiloxane and dried over a 3-4A molecular seive.

A gum began to form after 30 minutes, and the polymerization was continuted for 4-6 hours before the catalyst was neutralized with silylphosphate. The unreacted cyclics and other volatiles were removed by heating to 160° C. while agitating and maintaining a strong nitrogen purge. When the level of volatiles reached about 0.8 ($\pm$0.5) weight percent in the copolymer solution, the copolymer was discharged from the neutralization vessel to give 1897 parts by weight (81.6% yield) of a clear gum with a Williams Plasticity (3 minute value) of 178, specific gravity of 1.1708 at 77° F., and a refractive index of 1.3810 $D^{23°\ C.}$. Nuclear magnetic resonance (NMR) indicated a fluorosilicone content of 56.9 mole percent and a dimethylsiloxy content of 43.1 mole percent; Fourier Transform infrared assay (FTIR) indicated a vinyl content of 0.04 weight percent.

Sample 2

A fluorosilicone copolymer was prepared according to the procedure described above for Sample 1. A copolymer having a Williams Plasticity (3 minute value) of 208 was obtained; the fluorosilicone content (i.e., methyltrifluoropropyl-siloxy content) was 50.4 weight percent and the dimethylsiloxy content was 49.6 weight percent. The vinyl content was 0.03 weight percent.

Sample 3

A vinyl-terminated fluorosilicone copolymer was prepared according to the procedure described for Sample 1. The product (82% yield) was a clear gum having a Williams Plasticity (3 minute value) of 193. The copolymer vinyl content was 0.042 weight percent.

The three copolymers were compounded with a number of conventional ingredients and an organic peroxide curing agent as follows:

| FORMULATION | |
|---|---|
| Ingredient | Amounts (parts by weight) |
| Copolymer | 100 |
| Fluorosilicone hydrolyzate treated fumed silica[1] | 40 |
| Silica filler[2] | 6 |
| Silanol fluid processing aid[3] | 3.5 |
| Bis-dimethylvinylsilazane | 0.1 |
| Iron octoate | 0.04 |
| Cerium hydroxide | 0.40 |
| Curing co-agent[4] | 1.0 |
| Red pigment | 1.7 |
| Curing catalyst[5] | (1.5 parts/100 of total compound) |

[1]Treated filler according to copending U.S. Application Serial No. 410,004, filed August 20, 1982.
[2]Cab-O-Sil ® HS-5 (Cabot Corp.).
[3]Silanol-terminated polydimethylsiloxane (PDMS) fluid having the formula, HO—(Me$_2$SiO)$_5$—H.
[4]Trimethylol propane trimethacrylate (Sartomer ® 350; Sartomer Co.)
[5]Varox ® (R. T. Vanderbilt, Inc.) 45% 2,5-dimethyl-2,5-di(t-butylperoxy)hexane on inert fillers.

A control composition was also prepared according the same formulation using 100 parts of a blend of fluorosilicone homopolymer with a polydimethylsiloxane gum. The three sample formulations and the control were press cured 15 minutes at 350° F. and post baked 4 hours at 400° F. The following properties were observed in the cured elastomers:

| | Sample 1 | Sample 2 | Sample 3 | Control (blend) |
|---|---|---|---|---|
| Physical Properties | | | | |
| Fluorosilicone Content, m % | 56.9 | 50.4 | 50 | 66 |
| Shore A | 56 | 56 | 57 | 51 |
| Tensile, psi | 1070 | 1035 | 1060 | 1050 |
| Elongated, % | 420 | 410 | 430 | 450 |
| Die B Tear, pi | 102 | 100 | 117 | 107 |
| Spec. Gr. | 1.3595 | 1.3300 | 1.3350 | 1.345 |
| Bashore | 35 | — | — | — |
| Comp. Set, Method B. 22 hrs./350° F., % | 17.5 | 13.6 | 12.7 | 25 |
| Fuel Immersion, Fuel B 22 hrs./RT | | | | |
| Volume Swell % | 87.6 | 108 | 121.5 | 91.8 |
| Heat Age, 70 hrs./437 F. | | | | |
| Store Change | 0 | +1 | +2 | — |
| % Tensile Change | −9.6% | −7% | −5% | — |
| % Elongation Change | −14.2% | −15% | −16% | — |
| % Dimensional Change | 1.1% | 1.3% | 1.4% | — |

It is seen that in identical formulations the copolymers of the present invention show comparable or superior physical properties, with a significantly lower fluorosilicone content, when compared to a conventional fluorosilicone/PDMS blend. Especially promising results are obtained in the important areas of compression set, solvent swell and dimensional stability after heat aging. The samples prepared in accordance with the invention, especially Sample 1, are believed to meet the strictest current aerospace industry specifications.

Modifications and variations in the present invention are obviously possible in light of the foregoing disclosure. It is understood, however, that incidental changes made in the particular embodiments of the invention as described herein are within the full intended scope of the appended claims.

What is claimed is:

1. A peroxide-curable silanol-endstopped or alkenyl-endstopped diorganopolysiloxane copolymer having a molecular weight of from about 400,000 to about 600,000 comprising units of the formulae RR'SiO and R"$_2$SiO, wherein R is fluoroalkyl of from 3 to 8 carbon atoms, R' is alkyl of from 1 to 8 carbon atoms, alkenyl of from 2 to 8 carbon atoms, or phenyl, and wherein sufficient RR'SiO units are present to provide about 45–65 mole percent fluorosilicone content and sufficient R"$_2$SiO units containing alkenyl substituents are present to provide a vinyl content along the polysiloxane chain of about 0.02 weight percent to about 0.5 weight percent as CH$_2$=CH—.

2. A copolymer as defined in claim 1, wherein R is 3,3,3-trifluoropropyl, R' is methyl, and R" is methyl or vinyl.

3. A copolymer as defined in claim 2, wherein sufficient R" groups are vinyl to provide 0.02–0.2 weight percent vinyl content along the polysiloxane chain.

4. A curable fluorosilicone composition comprising (A) a silanol-endstopped or alkenyl-endstopped diorganopolysiloxane copolymer having a molecular weight of from about 400,000 to about 600,000 comprising units of the formulae RR'SiO and R"$_2$SiO, wherein R is fluoroalkyl of from 3 to 8 carbon atoms, R' is alkyl of from 1 to 8 carbon atoms or phenyl, and each R" is, independently, alkyl of from 1 to 8 carbon atoms, alkenyl of from 2 to 8 carbon atoms, or phenyl, and wherein sufficient RR'SiO units are present to provide about 45–65 mole percent fluorosilicone content and sufficient R"$_2$SiO units containing alkenyl substituents are present to provide a vinyl content along the polysiloxane chain of from about 0.02 weight percent to about 0.5 weight percent as CH$_2$=CH—; and (B) a peroxide curing catalyst.

5. A curable composition as defined in claim 4, wherein said peroxide curing catalyst is an organic peroxide compound in which at least 1 peroxide oxygen is attached to a tertiary carbon atom.

6. A curable composition as defined in claim 5, wherein R is 3,3,3-trifluoropropyl, R' is methyl, and R" is methyl or vinyl.

7. A curable composition as defined in claim 6, wherein said organic peroxide compound is present in an amount from about 0.01% to about 5.0% by weight.

8. A curable composition as defined in claim 7, wherein sufficient R" groups are vinyl so as to provide 0.02–0.2 weight percent vinyl content along the polysiloxane chain.

9. A curable composition as defined in claim 8, wherein said fluorosilicone content is in the range of 50–60 mole percent.

10. A curable composition as defined in claim 9, wherein said fluorosilicone content is in the range of 52–57 mole percent.

11. A curable composition as defined in claim 7, wherein said organic peroxide compound is 2,5-dimethyl-2,5-di-(t-butyl peroxy)hexane.

12. A curable composition as defined in claim 7, which is further compounded with a filler or combination of fillers.

13. A curable composition as defined in claim 12, wherein said filler is a silica filler treated with a diorganodihalogensilane hydrolyzate comprising mixed cyclic diorganopolysiloxanes and low molecular weight linear silanol-endstopped diorganopolysiloxanes.

14. A curable fluorosilicone composition comprising (A) a silanol-endstopped or vinyl-endstopped diorganopolysiloxane copolymer having a molecular weight of from 400,000 to about 600,000 comprising units of the formulae RR'SiO and R''$_2$SiO, wherein R is fluoroalkyl of from 3 to 8 carbon atoms, R' is alkyl of from 1 to 8 carbon atoms, and each R'' is, independently, alkyl of from 1 to 8 carbon atoms or vinyl, and wherein sufficient R-containing units are present to provide about 50–60 mole percent fluorosilicone content and sufficient vinyl-functional units are present to provide a vinyl content along the polysiloxane chain of about 0.02–0.5 weight percent as $CH_2=CH-$; (B) a peroxide curing catalyst in which at least one peroxide oxygen is attached to a tertiary carbon atom; and (C) cerium hydroxide.

15. A curable composition as defined in claim 14, wherein said vinyl content is from 0.02 to 0.2 weight percent.

16. A curable composition as defined in claim 15, wherein said curing catalyst is 2,5-dimethyl-2,5-di-(t-butyl peroxy)hexane.

17. A curable composition as defined in claim 15, which is further compounded with a silica filler treated with a diorganodihalogensilane hydrolyzate comprising mixed cyclic diorganopolysiloxanes and low molecular weight linear silanol-endstopped diorganopolysiloxanes.

18. A curable composition as defined in claim 17, which further comprises an organic silazane and a curing co-agent selected from trimethylol propane trimethacrylate, triallyl trimellitate, 1,3,5-trimethyl-1,3,5-trivinylcyclotrisiloxane, and 1,3,5,7-tetramethyl-1,3,5,7-tetravinylcyclotetrasiloxane.

19. A curable composition as defined in claim 18, wherein said organic silazane is bis-dimethyl-vinyl silazane, and said curing co-agent is trimethylol propane trimethacrylate.

* * * * *